(12) United States Patent
Pike et al.

(10) Patent No.: US 10,569,622 B2
(45) Date of Patent: Feb. 25, 2020

(54) VEHICLE ROOF HAVING A ROLLER BLIND ARRANGEMENT

(71) Applicant: WEBASTO SE, Stockdorf (DE)

(72) Inventors: Matthew Pike, Stockdorf (DE); Michael Schönberger, Stockdorf (DE); Jochen Haussmann, Andechs (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/580,237

(22) PCT Filed: May 12, 2016

(86) PCT No.: PCT/EP2016/060663
§ 371 (c)(1),
(2) Date: Dec. 6, 2017

(87) PCT Pub. No.: WO2016/202505
PCT Pub. Date: Dec. 22, 2016

(65) Prior Publication Data
US 2018/0162207 A1    Jun. 14, 2018

(30) Foreign Application Priority Data
Jun. 19, 2015   (DE) ........................ 10 2015 109 862

(51) Int. Cl.
*B60J 3/02* (2006.01)
*B60J 7/00* (2006.01)
*B60J 7/043* (2006.01)

(52) U.S. Cl.
CPC ........... *B60J 7/0015* (2013.01); *B60J 7/0007* (2013.01); *B60J 7/043* (2013.01)

(58) Field of Classification Search
CPC .............................. B60J 7/0015; B60J 7/0007
(Continued)

(56) References Cited

U.S. PATENT DOCUMENTS 8,430,148 B2   4/2013   Thalhammer et al.
9,067,479 B2 * 6/2015   Yukisada ............... B60J 7/0015
(Continued)

FOREIGN PATENT DOCUMENTS

DE              3428808 A1 * 2/1986   ............ B60J 7/0435
DE       202004015030 U1   11/2004
(Continued)

OTHER PUBLICATIONS

International Preliminary Report on Patentability issued against PCT/EP2016/060663 dated Sep. 21, 2016.
(Continued)

*Primary Examiner* — Dennis H Pedder
(74) *Attorney, Agent, or Firm* — Fitch, Even, Tabin & Flannery, LLP (57) ABSTRACT

A vehicle roof having a transparent roof section and a roller blind arrangement for selectively shading or at least partially not shading the transparent roof section, the roller blind arrangement having a roller blind web which is capable of being wound up to form a roller blind reel and which is provided with a guide tape on each of its edges arranged on either side of a vertical longitudinal center plane of the roof, each guide tape being guided in a respective guide rail, which is fixed to the roof. The roller blind arrangement comprises a roller blind module which has a cross member for the roller blind reel, the cross member extending in the transverse direction of the roof, and a guide leg on either side of the vertical longitudinal center plane of the roof, the guide legs being connected to the roof-fixed guide rails from below.

8 Claims, 11 Drawing Sheets

(58) Field of Classification Search
USPC .................................... 296/216.01–224, 214
See application file for complete search history.

(56) References Cited

U.S. PATENT DOCUMENTS

2014/0097636 A1\*  4/2014  Snider ..................... B60J 1/001
                                                    296/97.8
2016/0009165 A1    1/2016  Sawada

FOREIGN PATENT DOCUMENTS

| DE | 102006051488 A1   | 5/2008  |          |
|----|-------------------|---------|----------|
| DE | 102006021650 B4 \* | 2/2009  | ............. B60J 7/057 |
| DE | 212013000289 U1   | 11/2015 |          |
| JP | 2014-234018 A     | 12/2014 |          |
| WO | 2007/057205 A1    | 5/2007  |          |
| WO | 2007/068217 A1    | 6/2007  |          |

OTHER PUBLICATIONS

International Search Report for PCT/EP2016/060663 dated Sep. 21, 2016 and English translation submitted herewith (6 Pages).

\* cited by examiner

VEHICLE ROOF HAVING A ROLLER BLIND ARRANGEMENT

CROSS-REFERENCE TO RELATED APPLICATIONS

This application is a U.S. national phase application filed under 35 U.S.C. § 371 of International Application No. PCT/EP2016/060663, filed May 12, 2016, designating the United States, which claims priority from German Patent Application No. 10 2015 109 862.8, filed Jun. 19, 2015, which are hereby incorporated herein by reference in their entirety for all purposes.

FIELD

The invention relates to a vehicle roof having the features of the preamble of claim 1.

BACKGROUND

A vehicle roof of this kind is known from practice and comprises a transparent roof section, which may be formed by a glass lid element of a sliding roof arrangement, for example, and which can be selectively shaded or at least partially not shaded by means of a roller blind arrangement. The roller blind arrangement comprises a roller blind web which is capable of being wound up to form a roller blind reel on a winding shaft, which is arranged in the area of a rear-side edge of the transparent roof section, or of being unwound from the winding shaft so as to shade the transparent roof section. With respect to a vertical longitudinal center plane of the roof, the roller blind web is provided with a guide tape on either side, each guide tape being guided in a guide rail which is arranged on the respective edge of the transparent roof section and is fixed to the roof. This ensures that the portions of the roller blind web that are unwound from the winding shaft are kept under tension in the transverse direction of the vehicle.

SUMMARY

In previously known vehicle roofs of the kind described above, the roller blind arrangement in its entirety is preinstalled on the roof before the roof is installed on a vehicle body from above. Hence, the roller blind arrangement has to fit through an upper cutout in the vehicle body together with the other roof components. However, since the roller blind reel and the winding shaft of the roller blind arrangement should be installed below an opaque roof section for design reasons, the roller blind arrangement limits a size of the transparent see-through portion of the vehicle roof.

The object of the invention is to provide a vehicle roof of the kind mentioned above that has a laterally guided roller blind arrangement that allows for a larger see-through portion of the roof in comparison to the described state of the art without detracting from the appearance of the vehicle roof.

This object is attained according to the invention by the vehicle roof having the features of claim 1.

In the vehicle roof according to the invention, the roller blind arrangement thus comprises a roller blind module which is connected via its two guide legs to the rear ends of the guide rails, which are fixed to the roof, the cross member, on which the roller blind web forms a roller blind reel when in the wound-up state, thus being offset from the roof-fixed guide rails in the direction of the vehicle rear or in the direction of the vehicle front. The bilaterally arranged guide legs consequently allow continuing the roof-fixed guide rails into an area of the vehicle roof where no see-through option is desired anyway. In this way, maximum extension of the transparent roof section in the longitudinal direction of the roof is possible too without limitation by the roller blind reel. Owing to the guide legs of the roller blind module, it is also possible to arrange the cross member for the roller blind reel above a cargo space of the vehicle in question, the roller blind reel thus not affecting the headroom for vehicle passengers because no installation space has to be reserved for the roller blind reel above the seats of the vehicle in question.

Instead, the vehicle roof can have a small structural height in these areas. In consequence, the roller blind module designed as envisioned by the invention thus allows for a large see-through portion of the roof and/or for large headroom for vehicle passengers in the back of the vehicle.

In a preferred embodiment of the vehicle roof according to the invention, each guide leg has a guide track for a guide tape of the roller blind web, the guide track continuing in a guide channel of the respective roof-fixed guide rail, to also ensure smooth lateral guiding of the roller blind web in the area of the guide legs of the roller blind module and thus outside of the see-through portions of the vehicle roof.

For actuation of the roller blind arrangement, the roller blind web advantageously has a pull bar which is guided in the guide rails and in the guide legs of the roller blind module via lateral sliders.

In general, the roller blind arrangement according to the invention can be actuated manually or by motor. In a specific motor-driven embodiment, the lateral sliders of the pull bar each have a receiver for a coupling element of a respective drive cable, which is driven by a drive motor. Advantageously, the drive motor jointly drives both drive cables. It can be arranged forward of the transparent roof section or to the rear of the cross member of the roller blind module. It is also conceivable that in the drive motor is attached to the cross member of the roller blind module and that the drive cables are guided toward the sliders of the pull bar via the guide legs of the roller blind module.

To allow the roller blind module including the roller blind web and including the pull bar to be installed on the roof-fixed guide rails from below, i.e. upside down, the receivers for the coupling elements of the drive cables are open at the top and in the direction of the respective coupling element while still receiving the coupling elements without play in the longitudinal direction of the respective guide rail. At the bottom side, the receivers each have a stop face for the respective coupling element.

In order to facilitate overhead installation of the roller blind module, it is advantageous if the receivers each have entry slopes for the respective coupling element.

In case of drive cables pre-installed on the roof-fixed guide rails, the coupling elements are preferably guided in the guide rails in a manner secured against twisting, preventing them from prematurely adopting their installed position in relation to the receivers of the pull bar sliders when the roller blind module is being installed. In particular, the coupling elements each comprise a tongue which points in the direction of the vertical longitudinal center plane of the roof. The tongues of the coupling elements thus protrude out of cable channels of the drive cables in the direction of the vertical longitudinal center plane of the roof and simply have to be engaged with the pull bar sliders, i.e. their receivers, when installing the roller blind module.

In order to increase the torsion resistance of the roller blind module and to thus also facilitate its installation, a stiffening strut extends between the guide legs of the roller blind module in an advantageous embodiment of the vehicle roof according to the invention, the roller blind web engaging over said stiffening strut. The stiffening strut can also form a leading edge for the roller blind web.

The cross member of the roller blind module can form a receiving space for the roller blind reel. In particular, the receiving space accommodates a winding shaft for the roller blind web, which can be pre-tensioned in the winding-up direction of the roller blind web by means of a winding spring. In an alternative embodiment of the vehicle roof according to the invention, the lateral guide tapes of the roller blind web can also be formed by constant force springs which, outside of the guide rails and guide legs of the roller blind module, cause the roller blind web to be wound up to form the roller blind reel. In this case, there is no need for a winding spring and, depending on the application, no need for a winding shaft or winding tube, either.

In a specific embodiment, the guide legs and, if applicable, the cross member of the roller blind module, too, are made of plastic. In this case, the guide legs are advantageously formed by injection-molded parts, which can have a complex geometry.

The guide legs can thus each be curved in the longitudinal direction of the roof, said curvature meeting the installation-space conditions available in the vehicle roof in question.

For stabilizing the overall system of the vehicle roof, it is advantageous if the roller blind module is secured to an opaque roof section from below via at least one suspension, the opaque roof section being arranged to the rear of the transparent roof section.

BRIEF DESCRIPTIONS OF THE DRAWINGS

Other advantages and advantageous embodiments of the subject-matter of the invention are apparent from the description, the drawing and the claims.

An example of an embodiment of a vehicle roof according to the invention is illustrated in the drawing in a schematically simplified manner and is explained in more detail below.

DETAILED DESCRIPTION

Figure 1:
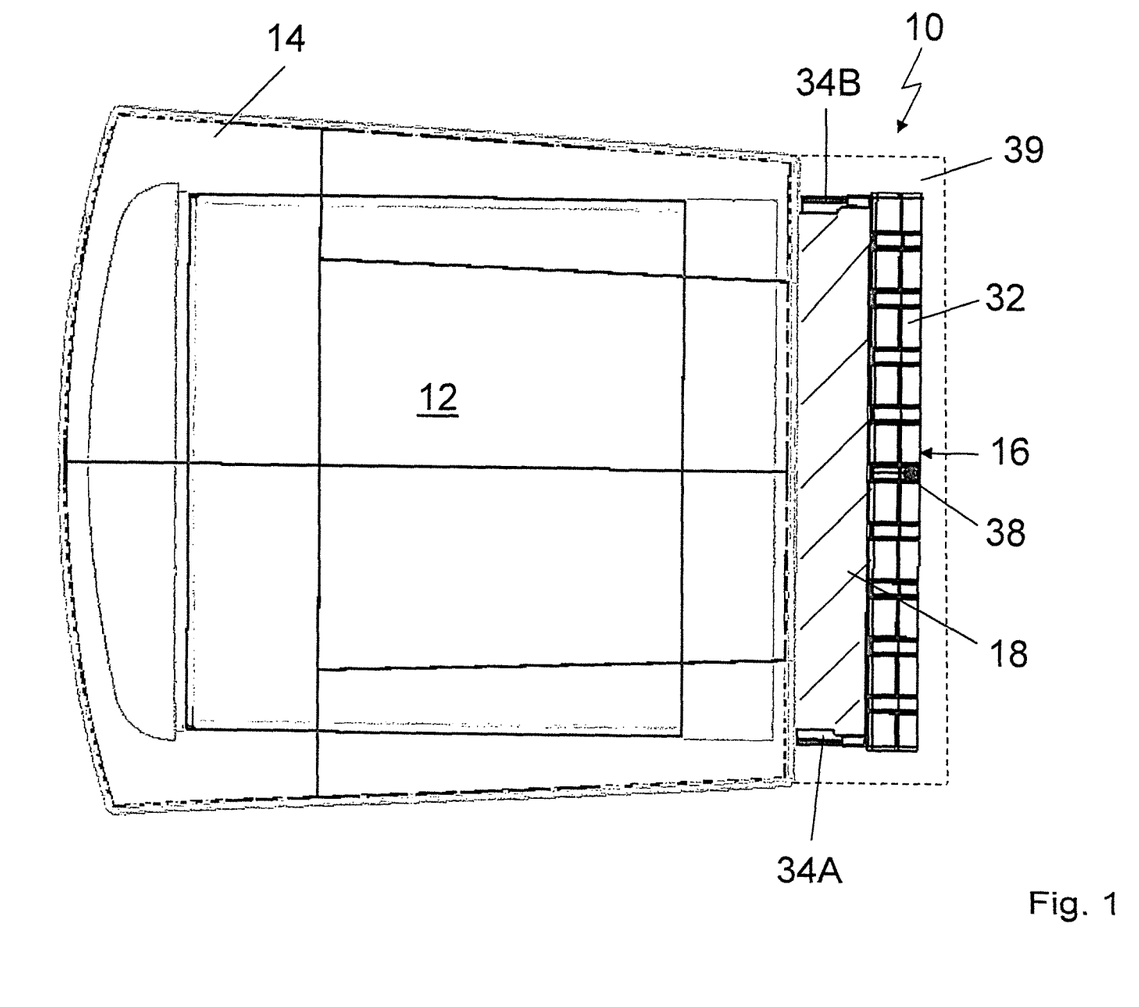
FIG. 1 shows a top view of a vehicle roof having a roller blind arrangement.
Figure 2:
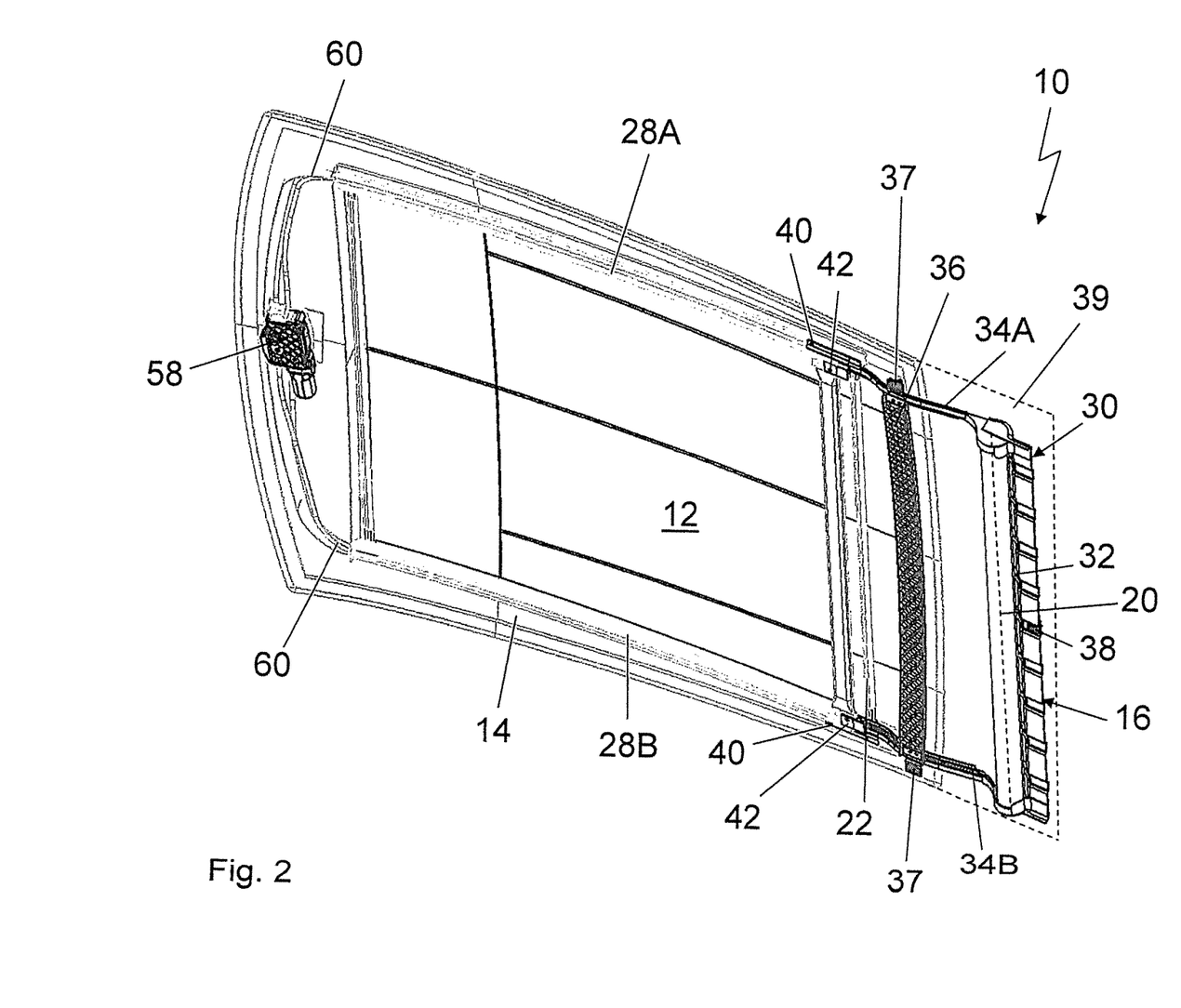
FIG. 2 shows a perspective bottom view of the vehicle roof of FIG. 1.

In the drawing, a vehicle roof 10 associated with a panoramic roof of a passenger automobile and having a transparent roof section 12 formed by a displaceable lid element is illustrated, the transparent roof section 12 being framed by an opaque roof body 14. In order to selectively shade or at least partially not shade the transparent roof section 12, the underside of the vehicle roof 10 is provided with a roller blind arrangement 16. To the rear of the roof body 14, another opaque roof element is arranged, which is arranged above a cargo space of the passenger automobile.

The roller blind arrangement 16 comprises a roller blind web 18 which can be wound onto winding shaft 20 extending in the transverse direction of the roof in order to not shade the transparent roof section or can be unwound from the winding shaft 20 in order to shade the transparent roof section 12. At its edge facing away from the winding shaft 20, the roller blind web 18 is provided with a pull bar 22 extending in the transverse direction of the roof, actuation of the pull bar 22 causing the roller blind web 18 to be wound onto or unwound from the winding shaft 20.

The winding shaft 20 is configured in the usual manner and comprises a winding tube which is pre-tensioned in the winding-up direction of the roller blind web 18 by means of a winding spring. When the pull bar 22 is released or displaced in the direction of the winding shaft 20, the roller blind web 18 is thus automatically wound onto the winding shaft 20 to form a roller blind reel.

At each of its lateral edges arranged on either side of the vertical longitudinal center plane of the roof, the roller blind web 18 is provided with a guide tape 24 which is guided in a guide channel 26 of a guide rail 28A or 28B attached to the underside of the opaque roof body 14. The guide rails 28A and 28B, which are consequently fixed to the roof, extend along the edges of the transparent roof section 12 which are arranged laterally with respect to the vertical longitudinal center plane of the roof.

Figure 3:
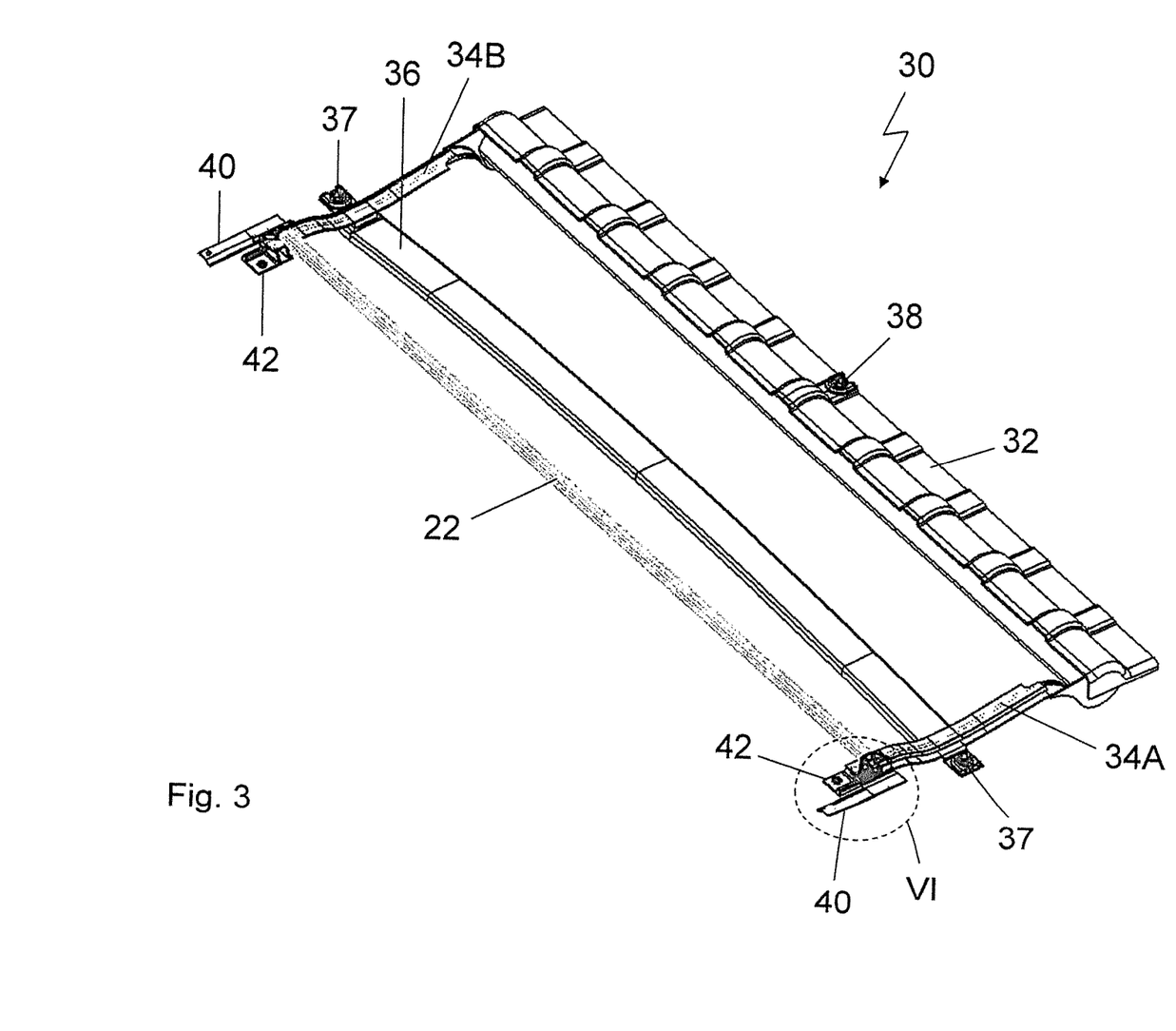
FIG. 3 shows a perspective illustration of an isolated roller blind module of the roller blind arrangement.

The roller blind arrangement 16 further comprises a roller blind module 30 which comprises a cross member 32 extending in the transverse direction of the vehicle and forming a receiving space for the winding shaft 20 and for the roller blind reel of the roller blind web 18 formed on the winding shaft 20.

The roller blind module 30 further comprises two guide legs 34A and 34B which are connected to the two end sides of the cross member 32 and which extend in the longitudinal direction of the vehicle as far as to the roof-fixed guide rails 28A and 28B and are connected to them. A stiffening strut 36 extends between the two guide legs 34A and 34B, which, at each of its ends, is fixed to the underside of the roof body 14 via a suspension 37, which is configured in the usual manner. The cross member 32 comprises another suspension 38, which is connected to the underside of the opaque roof element 39 arranged to the rear of the roof body 14 and outside of the headroom of vehicle passengers.

The roller blind module 30 is connected to the roof-fixed guide rails 28A and 28B from below via the guide legs 34A and 34B. For this purpose, the guide legs 34A and 34B each have two fixing tabs 40 and 42 at their end sides facing away from the cross member 32, the fixing tabs each being in contact with the respective guide rail 28A or 28B from below and each being attached to the respective guide rail 28A or 28B via a respective screw hole 44 or 46, which is penetrated by a corresponding screw 45 which engages into a nut 47.

For exact positioning of the roller blind module 30 in relation to the guide rails 28A and 28B in the longitudinal direction of the rails, fixing tab 42 has a centering ring 48 at the upper side, which follows the edge of screw hole 46 and which engages into a corresponding recess 50 of the respective guide rail 28A or 28B. For exact positioning of the guide legs 34A and 34B in relation to the guide rails 28A and 28B in the transverse direction of the roof, a rib 52 extending in the longitudinal direction of the rails is arranged at the upper side of fixing tab 42, the rib 52 engaging into a corresponding recess 54 at the underside of the respective roof-fixed guide rail 28A or 28B.

Each guide leg 34A and 34B is formed by a plastic injection-molded part and is curved in the longitudinal direction of the roof in an S-shape, in the broadest sense, between the cross member 32 and the guide rails 28A and 28B.

Figure 8:
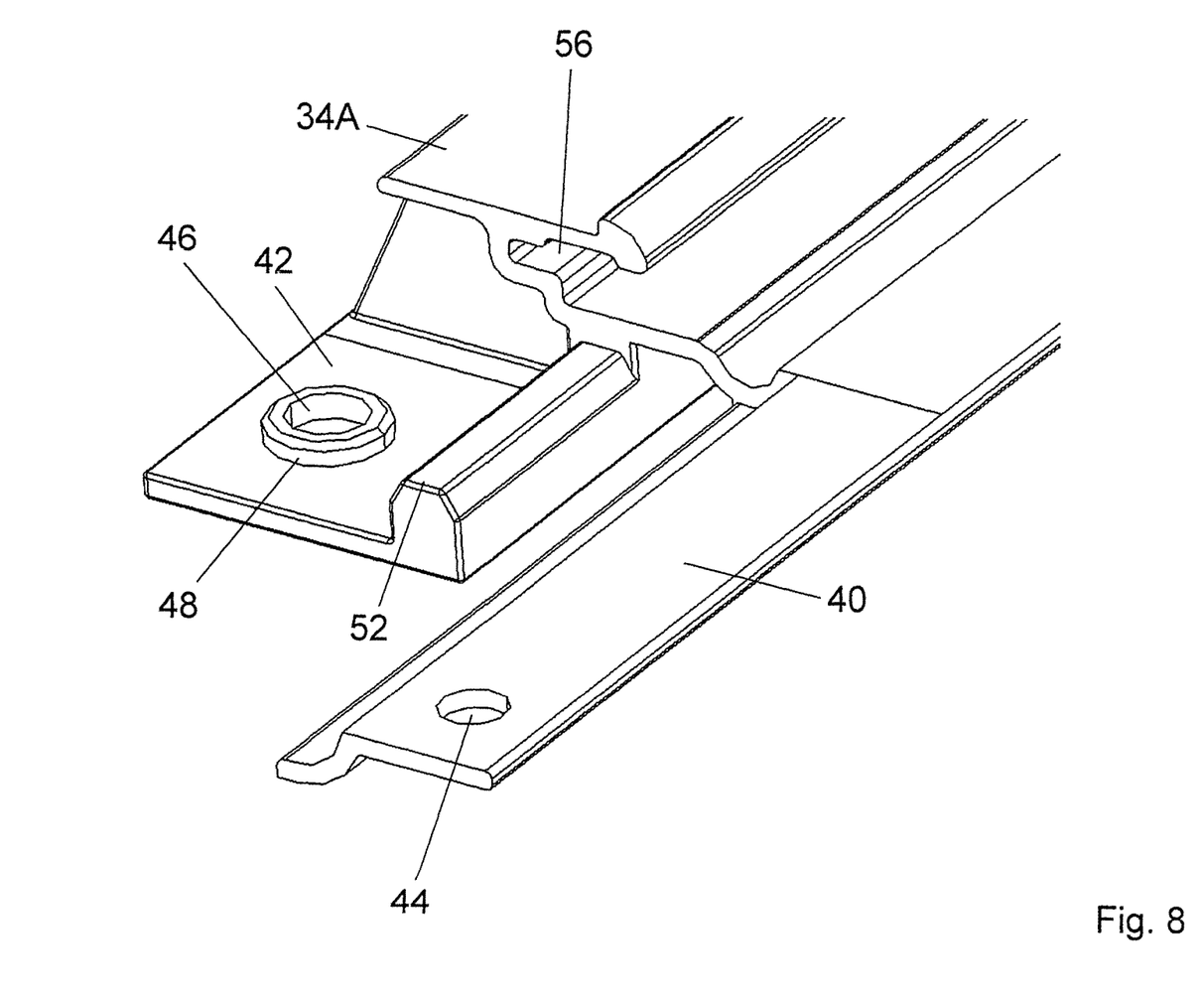
FIG. 8 shows a perspective front-end view of area VI (framed by dashes in FIG. 3) of the roller blind module in the transition area.
Figure 9:
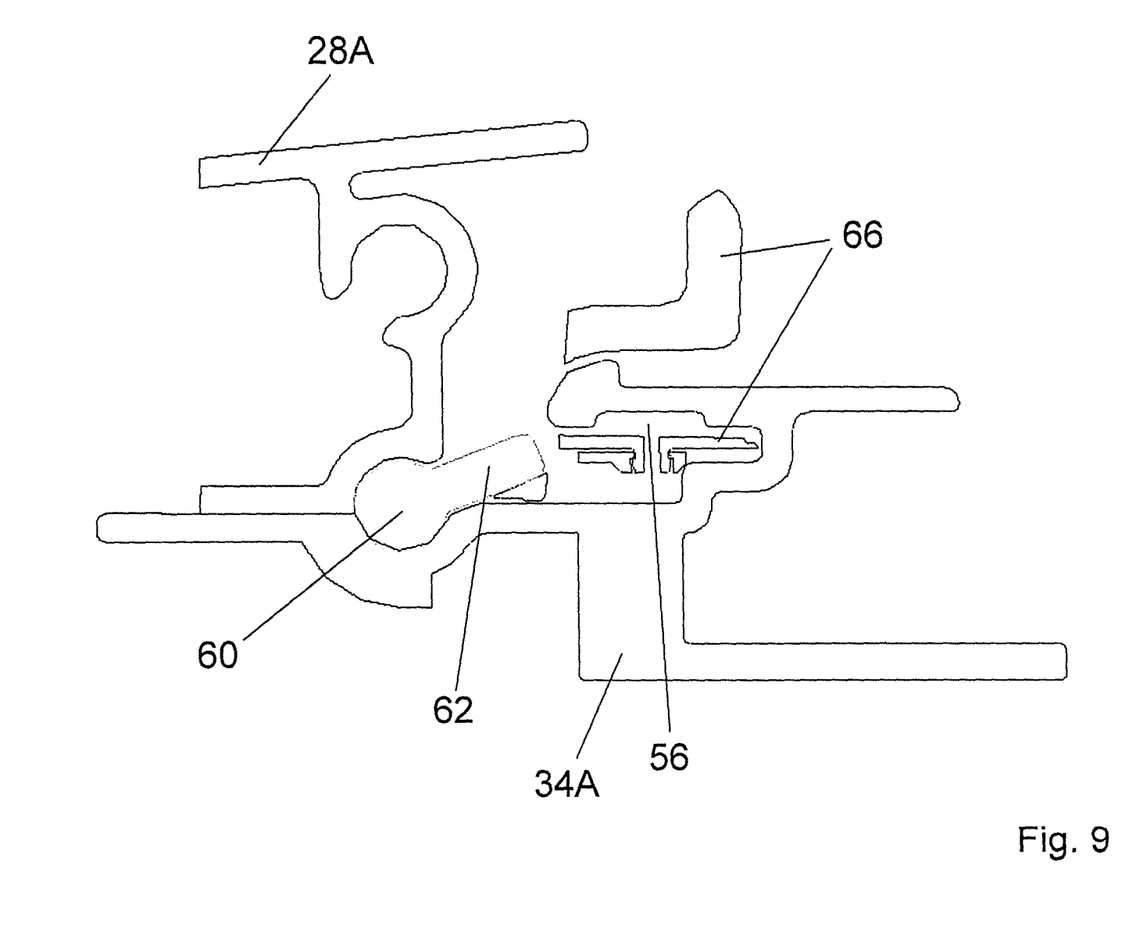
FIG. 9 shows a cross-section through the transition area along line IX-IX in FIG. 5.
Figure 10:
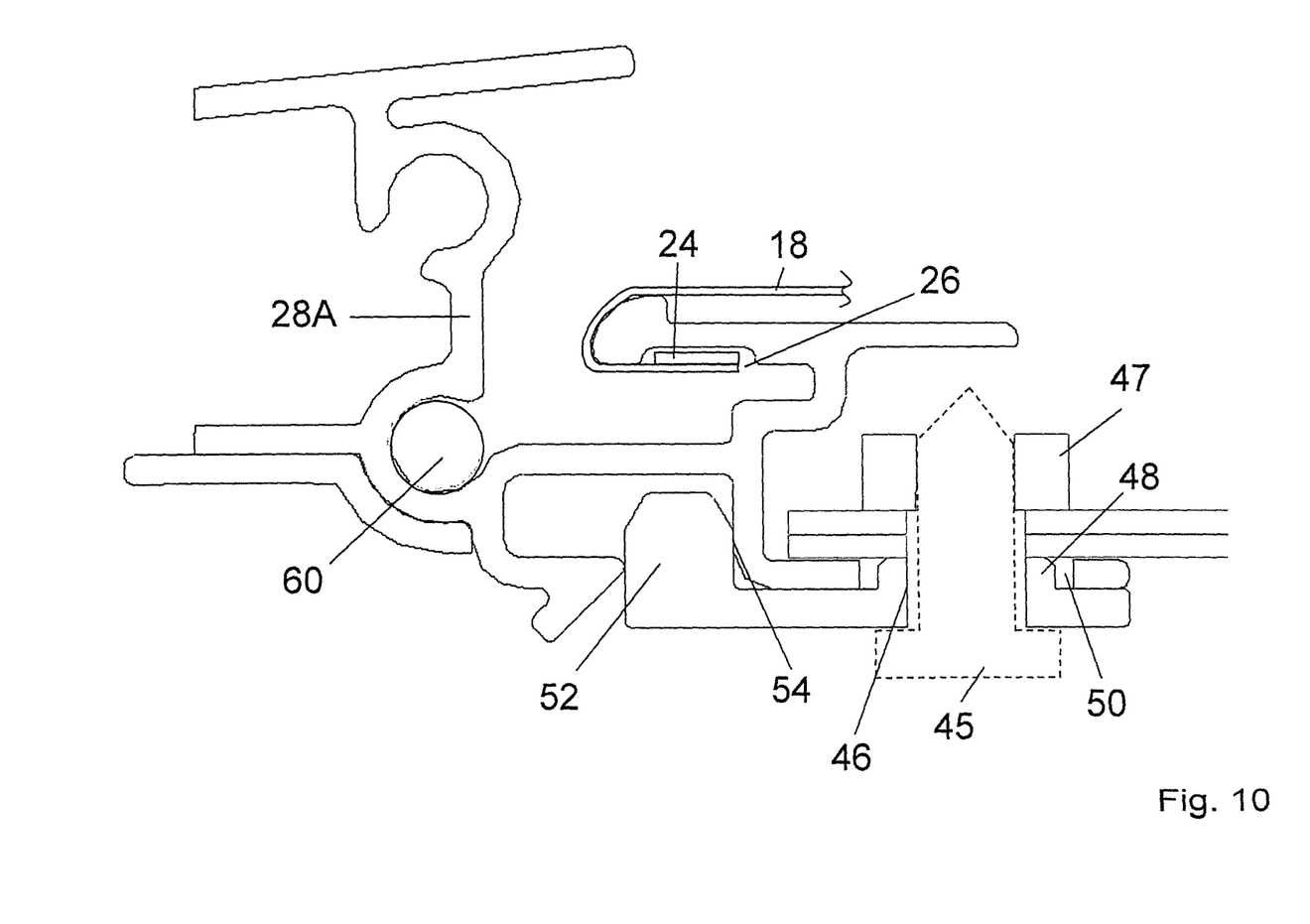
FIG. 10 shows a cross-section through the transition area of line X-X in FIG. 5, but with the roller blind web pulled-out.
Figure 11:
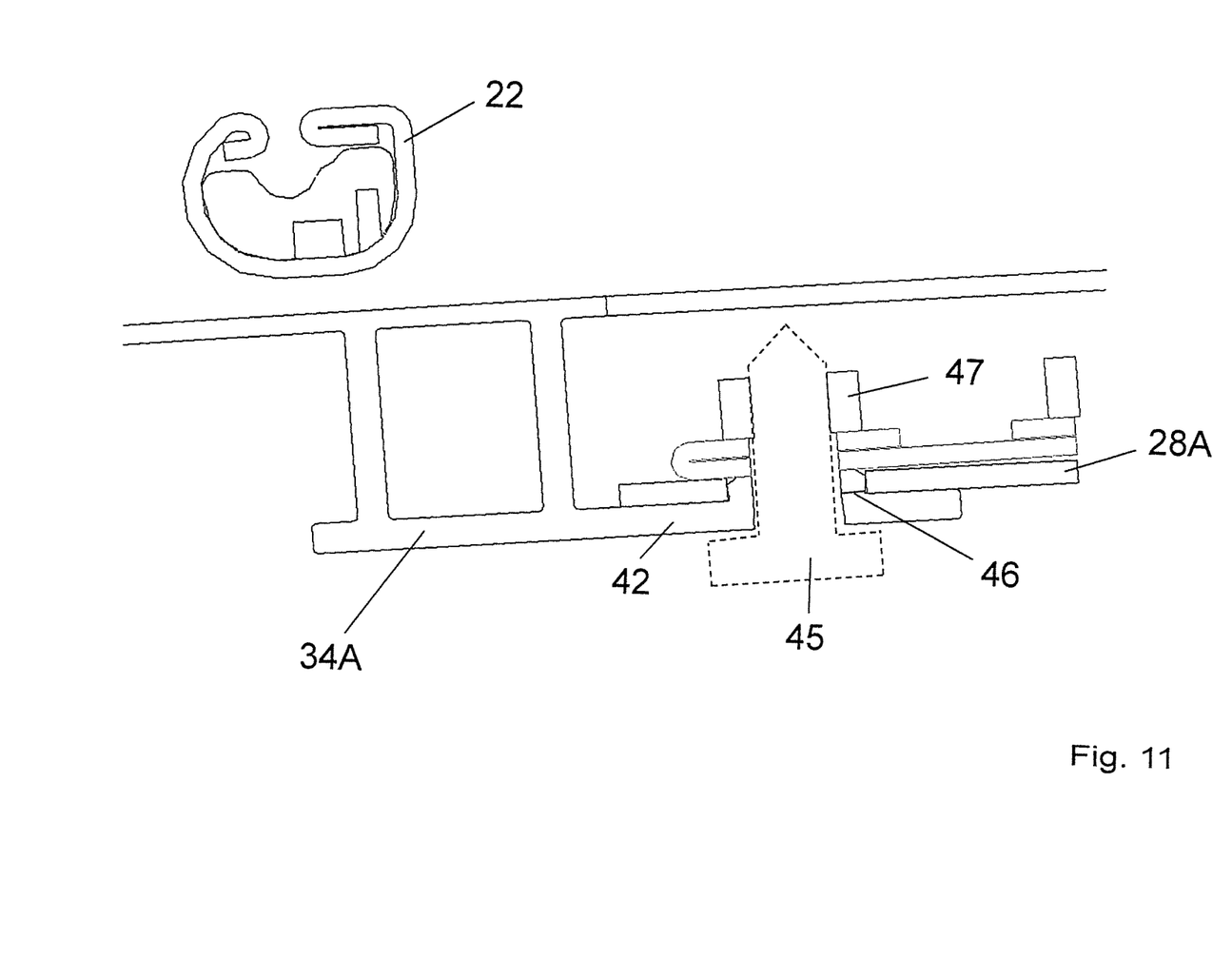
FIG. 11 shows a cross-section through the transition area along line XI-XI in FIG. 5.

As can be seen in particular in FIG. 8, the guide legs 34A and 34B also have a guide track 56, which corresponds to the respective guide channel 26 of the respective roof-fixed guide rail 28A or 28B and in which the respective lateral edge portion of the roller blind web 18 is guided by means of the guide tape 24 between the cross member 32 and the respective roof-fixed guide rail 28A or 28B. Owing to the lateral guiding of the roller blind web 18 in the guide rails 28A and 28B and in the guide legs 34A and 34B, the portions of the roller blind web 18 that are unwound from the winding shaft 20 are kept under tension in the transverse direction of the vehicle.

For being driven, the roller blind arrangement 16 has a drive motor 58 which is attached to the underside of the opaque roof body 14 in front of the transparent roof section 12 with respect to the orientation of the vehicle and which drives two drive cables 60, which are formed by bending-resistant helix cables and the ends of which are each provided with a coupling element 62 which is configured in the manner of a tab or tongue and protrudes from the respective cable channel 64 of the respective guide rail 28A or 28B in the direction of the vertical longitudinal center plane of the roof. By means of the coupling element 62, whose thickness about corresponds to the width of the exit slot of the cable channel 64, the drive cable 60 is guided in the respective cable channel 64 in a manner secured against twisting. The coupling element 62 is thus supported, at least with its upper side, by the respective guide rail 28A or 28B.

At each of its bilaterally arranged ends, the pull bar 22 has a slider 66 which is guided in a sliding manner in the respective guide channel 26 and in the corresponding guide track 56 of the respective guide leg 34A or 34B adjacent thereto. The sliders 66 each have a receiver 68 in which the tab-like coupling element 62 is arranged without play in the sliding direction of the pull bar 22. The receiver 68 has entry slopes 70 along which the coupling element 62 is brought into position when the roller blind module 30 is being installed on the guide rails 28A and 28B.

Installation of the vehicle roof 10 illustrated in the drawing takes place in the manner described below.

Figure 4:
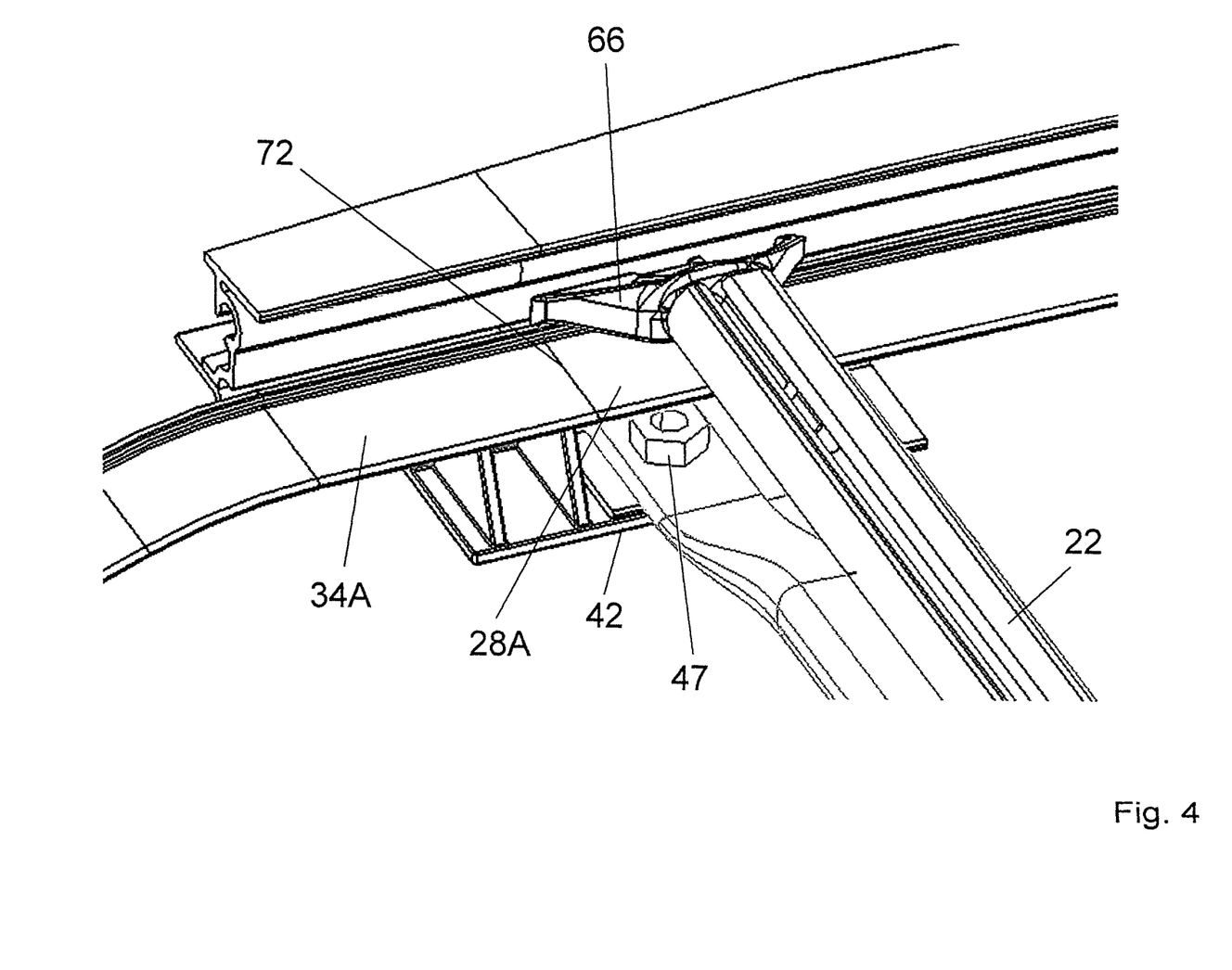
FIG. 4 shows the roller blind arrangement in a transition area between the roller blind module and a roof-fixed guide rail.
Figure 5:
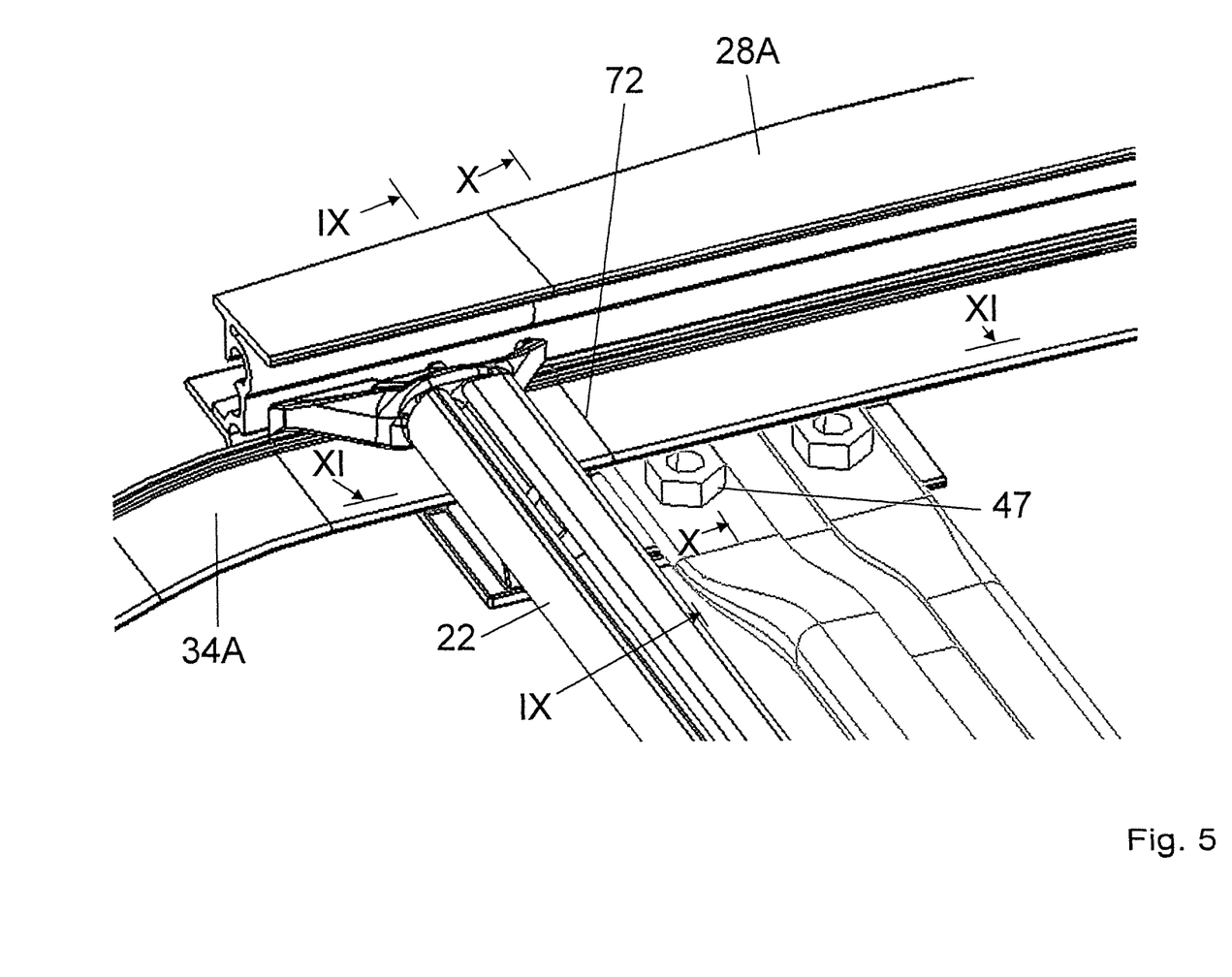
FIG. 5 shows a view corresponding to FIG. 4, but with a pull bar in an installed position.
Figure 6:
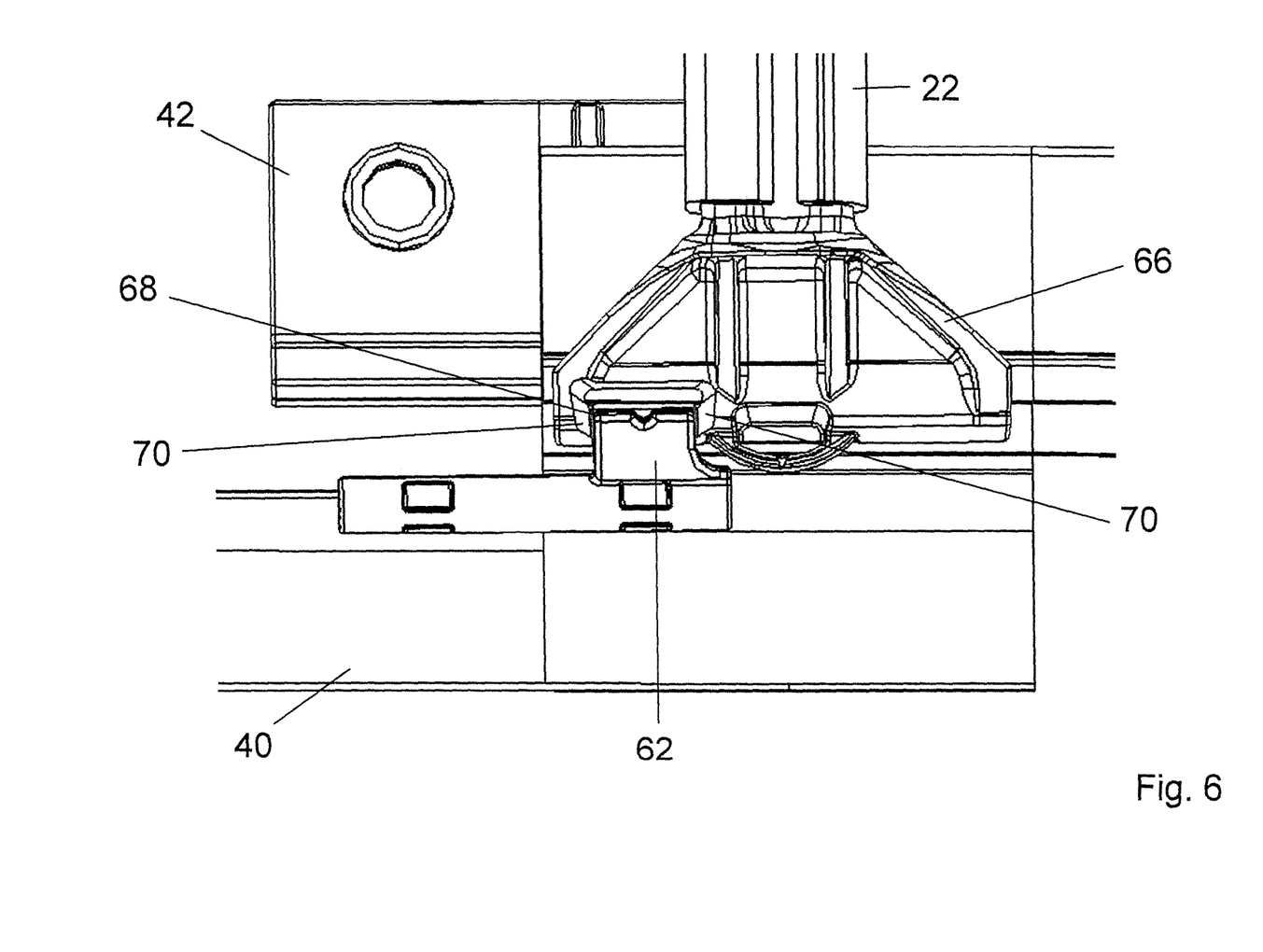
FIG. 6 shows a top view of an area VI of the roller blind module together with a coupling element of a drive cable, area VI being framed by dashes in FIG. 3.
Figure 7:
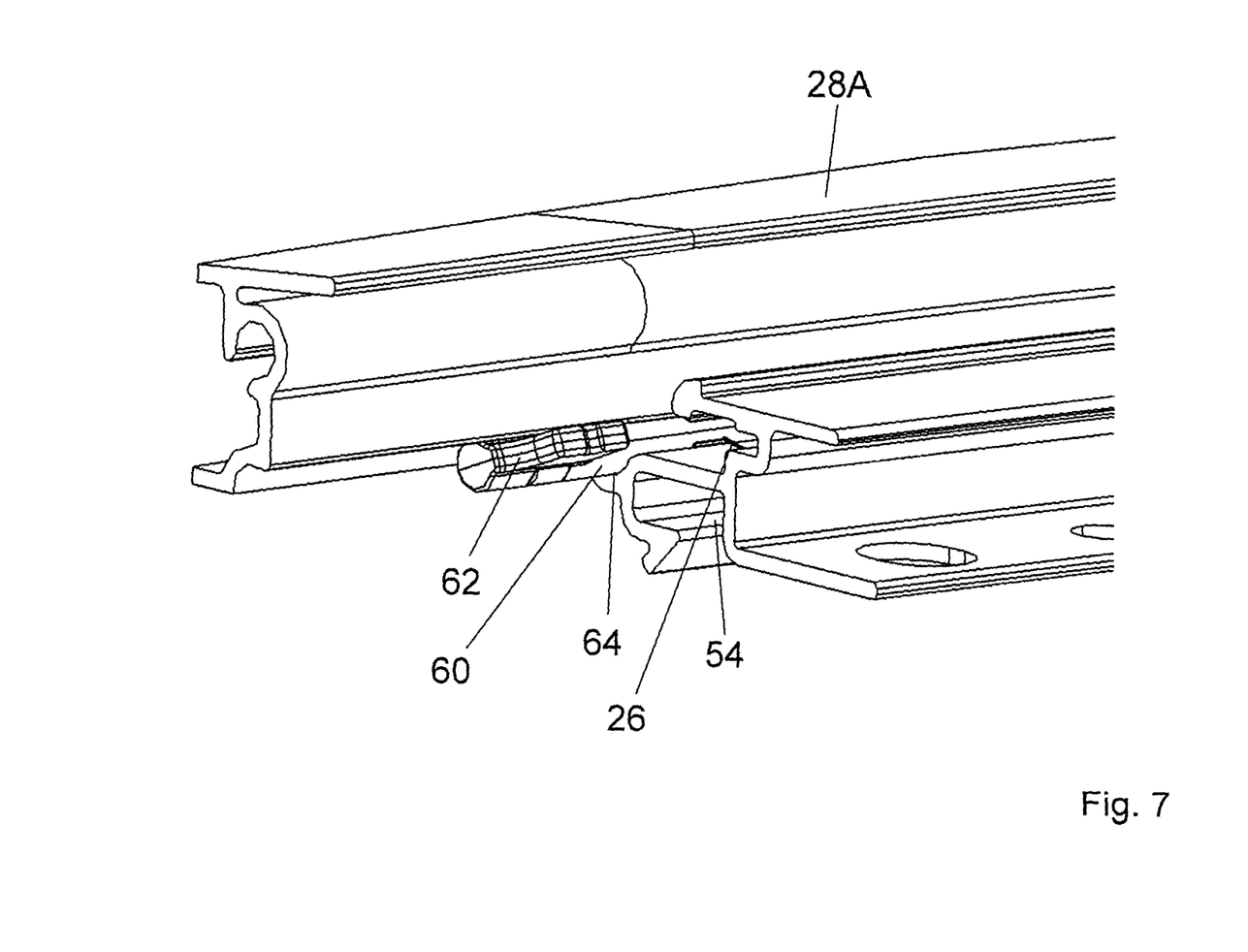
FIG. 7 shows a perspective front-end view of the roof-fixed guide rail in the transition area together with the coupling element of the drive cable.

First, a roof unit, which comprises the transparent roof section 12, the opaque roof body 14, the guide rails 28A and 28B, the drive motor 58 and the drive cables 60, is installed on a vehicle body. The coupling elements 62 of the drive cables 60 adopt the position illustrated in FIG. 7, i.e. they are arranged outside of the respective cable channel 64 in the respective rear-side end region of the guide rails 28A and 28B, thus being freely accessible from below. Subsequently, the roller blind module 30, which comprises the substantially U-shaped frame formed by the two guide legs 34A and 34B and by the cross member 32, the stiffening strut 36, and the roller blind web 18 including the winding shaft 20 and the pull bar 22, is screwed to the opaque roof sections, i.e. to the roof body 14 and to the roof element 39, from below via the suspensions 37 and 38 and to the guide rails 28A and 28B via the fixing tabs 40 and 42. In the process, the coupling elements 62 drive into the receivers 68 of the sliders 66 of the correspondingly positioned pull bar 22, the pull bar 22 thus being coupled with the drive cables 60 driven by the drive motor 58. At this point, the system has the arrangement illustrated in FIG. 5. Subsequently, the pull bar 22 or, more precisely, its sliders 66 are moved above the separating plane 72 formed between the guide legs 34A and 34B and the guide rails 28A and 28B, followed by the initialization of the drive motor 58. This means that the position of the pull bar 22 illustrated in FIG. 4 is associated with the open position of the roller blind arrangement 16. In this way, during standard operation of the roller blind arrangement 16, the sliders 66 are prevented from driving out of the metal guide rails 28A and 28B and into the plastic guide legs 34A and 34B, which might otherwise cause undesired noise.

REFERENCE SIGNS 10 vehicle roof
12 transparent roof section
14 opaque roof body
16 roller blind arrangement
18 roller blind web
20 winding shaft
22 pull bar
24 guide tape
26 guide channel
28A, 28B guide rail
30 roller blind module
32 cross member
34A, 34B guide leg
36 stiffening strut
37 suspension
38 suspension
39 roof element
40 fixing tab
42 fixing tab
44 screw hole
45 screw
46 screw hole
47 nut
48 centering ring
50 recess
52 rib
54 recess
56 guide track
58 drive motor
60 drive cable
62 coupling element
64 cable channel
66 slider
68 receiver
70 entry slope
72 separating plane

The invention claimed is:

1. A vehicle roof, comprising:

a transparent roof section and a roller blind arrangement for selectively shading or at least partially not shading the transparent roof section, the roller blind arrangement having a roller blind web which is capable of being wound up to form a roller blind reel and which is provided with a guide tape on each of its edges arranged on either side of a vertical longitudinal center plane of the roof, each guide tape being guided in a respective guide rail, which is fixed to the roof, wherein the roller blind arrangement comprises a roller blind module which has a cross member for the roller blind reel, the cross member extending in the transverse direction of the roof and having a guide leg on either side of the vertical longitudinal center plane of the roof, the guide legs being connected to the roof-fixed guide rails from below;

wherein the roller blind web has a pull bar which is guided in the guide rails and in the guide legs of the roller blind module via lateral sliders;

wherein each lateral slider has a receiver for a coupling element of a respective drive cable driven by a drive motor;

wherein each receiver is open at the top and configured to receive the respective coupling element without play in the longitudinal direction of the respective guide rail;

wherein the receivers each have entry slopes for the respective coupling element, and wherein the entry slopes define a funnel-shaped top opening of the receivers.

2. The vehicle roof according to claim 1, wherein in each guide leg has a guide track for the respective guide tape of the roller blind web, each guide track continuing in a guide channel of the respective roof-fixed guide rail.

3. The vehicle roof according to claim 1, wherein the coupling elements of the drive cables are guided in the guide rails in a manner secured against twisting and each comprise a tongue which points in the direction of the vertical longitudinal center plane of the roof.

4. The vehicle roof according to claim 1, wherein a stiffening strut extends between the guide legs, the roller blind web engaging over said stiffening strut.

5. A vehicle roof, comprising:

a transparent roof section and a roller blind arrangement for selectively shading or at least partially not shading the transparent roof section, the roller blind arrangement having a roller blind web which is capable of being wound up to form a roller blind reel and which is provided with a guide tape on each of its edges arranged on either side of a vertical longitudinal center plane of the roof, each guide tape being guided in a respective guide rail, which is fixed to the roof, wherein the roller blind arrangement comprises a roller blind module which has a cross member for the roller blind reel, the cross member extending in the transverse direction of the roof and having a guide leg on either side of the vertical longitudinal center plane of the roof, the guide legs being connected to the roof-fixed guide rails from below;

wherein the roller blind web has a pull bar which is guided in the guide rails and in the guide legs of the roller blind module via lateral sliders;

wherein each lateral slider has a receiver for a coupling element of a respective drive cable driven by a drive motor;

wherein each receiver is open at the top and configured to receive the respective coupling element without play in the longitudinal direction of the respective guide rail, and wherein the receivers each have entry slopes for the respective coupling element, and wherein the entry slopes define a funnel-shaped top opening of the receivers; and wherein the cross member forms a receiving space for the roller blind reel and accommodates a winding shaft for the roller blind web.

6. The vehicle roof according to claim 1, wherein the guide legs are made of plastic.

7. The vehicle roof according to claim 1, wherein the guide legs are curved in the longitudinal direction of the roof.

8. The vehicle roof according to claim 1, wherein the roller blind module is secured to an opaque roof section from below via at least one suspension, the opaque roof section being arranged to the rear of the trans-parent roof section.

* * * * *